Patented Sept. 4, 1923.

1,467,065

UNITED STATES PATENT OFFICE.

FRED PETMECKY, OF AUSTIN, TEXAS.

RADIATOR-REPAIR COMPOSITION.

No Drawing.   Application filed March 8, 1922. Serial No. 542,182.

*To all whom it may concern:*

Be it known that I, FRED PETMECKY, a citizen of the United States, and a resident of Austin, in the county of Travis and State of Texas, have invented certain new and useful Improvements in Radiator-Repair Compositions, of which the following is a specification.

My present invention relates generally to composition for introduction within automobile radiators and other metal parts of similar nature for the purpose of closing small leaks especially those difficult to reach by solder or other usual methods of repair, my object being the provision of a material which may be readily and easily formed, which is inexpensive, will adhere firmly and closely to metal, and will not endanger clogging of the regular water channels of the radiator.

My invention proposes as a composition for this use, a mixture of ground asbestos, dextrin and water and involves the preparation thereof by first boiling the water and stirring in the asbestos and dextrin while the water continues to boil and boiling the composition for a few minutes after thorough incorporation of the asbestos and dextrin.

The invention also proposes the use of asbestos, dextrin and water in about the proportion of one part of powdered asbestos to two parts of dextrin and five parts of water.

The resulting composition, being in a fluid state, may be readily introduced into an automobile radiator or other part of like nature, small leaks in which are to be repaired, and may be simply poured into the water within the radiator, the latter of which as well as the enclosure of the fluid within the radiator out of contact with the atmosphere, maintains the composition in its fluid readily movable state where it may freely circulate throughout the radiator. Where any small leaks are present, the composition upon escape and upon contact with the atmosphere hardens and seals by virtue of the presence of the asbestos as a carrier for the dextrin the latter of which hardens in the presence of the atmosphere to hold the asbestos in place within the small opening and the like.

In this way the composition upon introduction within the radiator, may be allowed to circulate until the leaks are closed and the remainder may then be washed out of the radiator without trouble and without danger of clogging any of the normal water passages.

I am aware that both asbestos and dextrin have been employed in sealing composition, but I am not aware that they have been used to form a composition with the simple addition of water, nor one which adapts the composition to adhere readily and firmly to metals, nor am I aware that they have been used in connection with water in the proportions above stated for this purpose.

I claim:

1. The herein described composition for closing leaks in radiators and like metal containers, consisting of powdered asbestos, dextrin and water in the proportions of one part of powdered asbestos to two parts of dextrin and five parts of water.

2. The herein described composition for closing leaks in radiators and like metal containers, formed by stirring powdered asbestos and dextrin into boiling water in the proportions of one part of asbestos to two parts of dextrin and five parts of water, and continuing to boil the mixture for a short time after the asbestos and dextrin have been thoroughly incorporated therein.

FRED PETMECKY.